US008798523B2

(12) United States Patent
Krebs

(10) Patent No.: US 8,798,523 B2
(45) Date of Patent: Aug. 5, 2014

(54) OBJECT SET OPTIMIZATION USING DEPENDENCY INFORMATION

(75) Inventor: Andreas S. Krebs, Karlsruhe (DE)

(73) Assignee: SAP AG, Walldorf (DE)

(*) Notice: Subject to any disclaimer, the term of this patent is extended or adjusted under 35 U.S.C. 154(b) by 0 days.

(21) Appl. No.: 13/488,976

(22) Filed: Jun. 5, 2012

(65) Prior Publication Data

US 2012/0244511 A1  Sep. 27, 2012

Related U.S. Application Data

(60) Division of application No. 12/343,727, filed on Dec. 24, 2008, now Pat. No. 8,214,820, which is a continuation of application No. 10/808,674, filed on Mar. 24, 2004, now Pat. No. 7,506,332.

(51) Int. Cl.
*G09B 7/00* (2006.01)
*G09B 5/00* (2006.01)
*G09B 7/02* (2006.01)
*G09B 5/06* (2006.01)
G09B 7/04 (2006.01)
G06F 11/36 (2006.01)
G06F 17/22 (2006.01)

(52) U.S. Cl.
CPC .. *G09B 5/00* (2013.01); *G09B 7/00* (2013.01); *G09B 7/02* (2013.01); *G09B 5/06* (2013.01); G09B 7/04 (2013.01); G06F 11/3684 (2013.01); G06F 17/2247 (2013.01); Y10S 706/927 (2013.01)
USPC .......................................... 434/362; 706/927

(58) Field of Classification Search
CPC .............. G09B 5/00; G09B 7/00; G09B 7/02; G09B 5/06; G09B 7/04; G06F 11/3684; G06F 17/2247; Y10S 706/927; G06Q 50/205
USPC .................. 434/322, 323, 336, 350, 353, 365
See application file for complete search history.

(56) References Cited

U.S. PATENT DOCUMENTS

| 4,588,413 | A | | 5/1986 | Keil et al. |
| 5,493,682 | A | | 2/1996 | Tyra et al. |
| 5,827,070 | A | * | 10/1998 | Kershaw et al. .............. 434/322 |
| 5,925,100 | A | | 7/1999 | Drewry et al. |
| 5,953,524 | A | | 9/1999 | Meng et al. |
| 6,149,441 | A | * | 11/2000 | Pellegrino et al. ............ 434/350 |
| 6,162,060 | A | * | 12/2000 | Richard et al. ................ 434/118 |
| 6,442,753 | B1 | | 8/2002 | Gerard et al. |
| 6,442,754 | B1 | | 8/2002 | Curtis |
| 6,519,571 | B1 | * | 2/2003 | Guheen et al. ............. 705/14.66 |
| 6,581,077 | B2 | | 6/2003 | Sokolov et al. |

(Continued)

OTHER PUBLICATIONS

Adobe Systems Incorporated, "Adobe Premiere 6.0 User Guide", 2000, Adobe Systems Incorporated, pp. 1-402.*

*Primary Examiner* — Jack Yip
(74) *Attorney, Agent, or Firm* — Kenyon & Kenyon LLP

(57) ABSTRACT

A method for optimizing dependencies for a set of objects includes: automatically detecting dependencies among a set of objects, where each of the objects in the set includes at least one linkable file; adding the detected dependencies to a dependency list; and removing dependencies from the dependency list for any object that does not have at least one file dependency. The method optionally includes removing unused files from the set of objects, breaking a selected object into smaller objects, and making a file having a large number of dependencies into its own object.

17 Claims, 10 Drawing Sheets

(56) References Cited

U.S. PATENT DOCUMENTS

| | | | |
|---|---|---|---|
| 6,622,003 B1* | 9/2003 | Denious et al. | 434/350 |
| 6,732,118 B2 | 5/2004 | Hermann et al. | |
| 6,820,101 B2 | 11/2004 | Wallman | |
| 6,931,521 B2 | 8/2005 | Hubert et al. | |
| 7,143,108 B1 | 11/2006 | George | |
| 7,506,332 B2 | 3/2009 | Krebs | |
| 2001/0039552 A1* | 11/2001 | Killi et al. | 707/500 |
| 2002/0168621 A1* | 11/2002 | Cook et al. | 434/350 |
| 2002/0169822 A1* | 11/2002 | Packard et al. | 709/203 |
| 2002/0182579 A1* | 12/2002 | Driscoll et al. | 434/350 |
| 2003/0009484 A1* | 1/2003 | Hamanaka et al. | 707/200 |
| 2003/0027121 A1* | 2/2003 | Grudnitski et al. | 434/308 |
| 2003/0113700 A1* | 6/2003 | Simon | 434/350 |
| 2003/0124502 A1* | 7/2003 | Chou | 434/350 |
| 2003/0163784 A1* | 8/2003 | Daniel et al. | 715/514 |
| 2003/0174160 A1* | 9/2003 | Deutscher et al. | 345/716 |
| 2003/0203342 A1* | 10/2003 | Bowers | 434/118 |
| 2004/0002039 A1* | 1/2004 | Draper et al. | 434/118 |
| 2004/0009462 A1* | 1/2004 | McElwrath | 434/350 |
| 2004/0046792 A1* | 3/2004 | Coste et al. | 345/763 |
| 2005/0125800 A1 | 6/2005 | Himmer et al. | |
| 2008/0293030 A1* | 11/2008 | Hixon et al. | 434/322 |

* cited by examiner

OBJECT SET OPTIMIZATION USING DEPENDENCY INFORMATION

CROSS REFERENCE TO RELATED PATENT APPLICATIONS

This patent application is a divisional of U.S. patent application Ser. No. 12/343,727, filed Dec. 24, 2008, which is a continuation of U.S. application Ser. No. 10/808,674, filed Mar. 24, 2004, now U.S. Pat. No. 7,506,332; the entire contents of each of which are incorporated herein by reference.

DESCRIPTION

1. Technical Field

This invention relates generally to learning systems, and more particularly to networked-based computerized learning systems.

2. Background Art

Computerized learning systems, sometimes referred to as "tutorial" systems, have been around for many years. The earliest of tutorial systems were designed for mainframe computers. With the advent of personal computers in the mid to late 70's, tutorial systems were increasingly available for home and office personal computer use. With the advent of personal computer networking, the market for network-based learning systems blossomed.

For example, PLATO Learning Systems, currently having a website at the World Wide Web ".com" address of "plato," began in 1963 with Control Data and University of Illinois using a grant from the National Science Foundation to develop technology and content for a mainframe computer based instructional system. In 1986 with the growth of personal computer technology, the PLATO courseware library and management systems were modified for delivery via local area networks. Starting in the 1990's the PLATO technology became available over wide area networks, such as the public wide area network commonly referred to as the Internet. When delivered over the Internet, courses are sometimes referred to as having "e-learning" content.

While the number of companies offering e-learning content is substantial, there are relatively fewer companies which are active in the business of creating tools for creating and managing e-learning content. SAP, for one, has been active in learning and e-learning technologies for a number of years.

Founded in 1972, SAP is a recognized leader in providing collaborative business solutions for all types of industries. SAP, headquartered in Walldorf Germany, is the world's largest enterprise software company. As such, a major focus of SAP's e-learning programs have been to provide powerful business oriented e-learning solutions to its core corporate customer base. More particularly, SAP provides a series of tools for authoring, managing and delivering e-learning content such that its customers can manage the entirety of the creative and administrative functions for a fully integrated e-learning system.

In FIG. 1, a SAP learning solution system 8 as it is being currently provided includes a master repository 10, a publishing database 12, an authoring environment 14, a curriculum administrator 16, a learning portal 18, and a content player 20. A user (also referred to as a "student" or "learner") 22 using, for example, a network browser running on a personal computer, can interact with the learning solution system 8.

With the learning solution system 8, the master repository 10 preferably includes all current courses, all previous versions of the courses, and all object independencies with respect to the courses, in one centralized (at least virtually) database. For example, the master repository 10 for a particular course would include all of the objects and dependencies for that course and, perhaps, multiple previous versions such as versions V1, V2, and V3. Therefore, it will be appreciated that the master repository not only includes the current versions of courses, but also previous versions of the courses that are no longer available. That is, the master repository may include many objects, files, and dependencies that are not used in the current selection of courses.

The publishing database 12 includes the currently available courses and a course list. The publishing database 12 is shown to be separate from the master repository 10 in FIG. 1, although it will be appreciated by those skilled in the art that they may be only virtually separated from each other. Furthermore, the databases 10 and 12 can be physically supported on the same computer system or on separate computer systems, as will be appreciated by those skilled in the art.

The authoring environment 14 is a part of the learning solutions system 8 which supports the creative process of developing new courses. Typically, the authoring environment is implemented on a personal computer system. As such, courses can be authored "off-line," i.e., without a real time connection to the other components of the learning solutions system 8. That is, a course can be developed on a personal computer hosting the authoring environment 14, and the personal computer can then be integrated with the other components of the learning solution system 8 for such activities as retrieval, check-in, and publishing.

As will be discussed in greater detail subsequently, the authoring environment 14 preferably includes a static dependency checker 24. This static dependency checker is used to help understand the dependencies between the various objects which make up a course. Using the static dependency checker, an author is assisted in determining which of the objects that have been created may be necessary to provide a complete course. This helps in the "packaging" of a course for efficient transmission and storage.

The curriculum administrator 16 allows an administrator to organize and manage a collection of courses. The curriculum administrator can, for example, review course materials and then organize the courses into a course list along with parameters such as availability, cost, prerequisites, etc. As was the case with the authoring environment, the curriculum administrator software may be implemented on a personal computer system which is in at least part-time communication with the publishing database. The personal computer system can be the same computer system used for the authoring environment, or a different computer system.

It should be noted that a rich mix of media can be used with learning solutions system 8. The course can, for example, be a web-based HTML course, but can also include JAVA scripts as well as spreadsheets (e.g., Excel® spreadsheets), presentations (e.g., PowerPoint.®. presentations), Adobe Acrobat® .pdf files, etc. The courses therefore can be considered to include a number of "objects" which, as is well known to those skilled in the art, can include both executable instructions and data. The instructions and/or data are often arranged in electronic "files." These files typically "point," i.e., refer to, other files which may be internal or external to the object in which they reside.

If a file references another file, it is said to have a "file dependency" upon that other file. If the other file in another object, the two objects are said to have an "object dependency." It is therefore important to provide course having all of such dependencies. If not all dependencies are included with a the set of objects comprising a course, errors are likely to occur as a learner attempts to access a file that is not present with the course.

A learner 22 can access the learning system 8 in a number of fashions. Typically, however, the learner 22 uses a personal computer system provided with web browser software (such as an Internet Explorer® software available from Microsoft Corporation) which is used to access learning portal 18. In that case, the learning portal 18 would operate as a web server to provide HTML documents including a course list, which can be displayed in the web browser window of the learner 22 personal computer. The learner 22 can then select a course from the course list and communicate with content player 20 to retrieve course information from the publishing database 12 and the course itself from the master repository 10. The content player 20 then communicates with the learner 22 to preferably provide an interactive learning session.

As noted previously, it is important that a course include all of the objects which are required to fulfill its dependencies. If not all of such objects are provided, the course will include errors. That is, a user may try to open a particular file and find out that that file is not available because the object in which it resides is not available. In order to address this issue, the SAP learning solution system 8 includes a manual dependency editor 24.

A screen shot 26 which illustrates the functionality of the manual dependency editor 24 can be found in FIG. 2. Screen shot 26 shows a window 28 entitled "Repository Explorer" and an overlying window 30 entitled "Attributes of Object." As noted, the object test(v-) 32 is selected from the Repository Explorer window 28 such that the Attributes of Object window 30 shows its attributes. That is, on the left side of window 30 it shows that the current dependencies are f/bug/lo_skip/. On the right side of window 30 are other potential dependency candidates, i.e., other objects to which object test(v-) might have a dependency. The author must then manually examine and analyze the dependency candidate to see if it should be added to the current dependency's list by using the "add button" 34. It will be appreciated that this is a cumbersome, time consuming and error prone process.

A process 36 implemented by the manual dependency editor 24 of FIG. 1 is illustrated in greater detail in FIG. 3. The process 36 begins at 38 and, in a operation 40, an object is selected, e.g., the object test(v-). Next, in an operation 42, a candidate list is displayed as illustrated by the right hand side of window 30 of FIG. 2. If the author believes that there is an actual dependency the dependency is added to the current dependency list on the left hand side of window 30 of FIG. 2 by pressing the add button 34. As appreciated by those skilled in the art, by "pressing" it is meant that the "add button" 34 is selected by an on-screen pointer (not shown) as controlled by a pointing device such as a mouse or trackball, and then "pressed" by "clicking" a physical button on the pointing device.

In a decision operation 48 it is determined whether the author is done with manually observing the dependency candidate list in window and 30 and, if not, the operations 42-48 are repeated. If the author is done, it is determined whether other objects, such as object tmp2(v-), shown on the left-hand side of window 28 of FIG. 2, should be checked for dependencies. If the author has not finished analyzing the objects, the operations 40-50 are repeated. If, however, the author is done, the process 36 is completed at 52.

In FIG. 4, the authoring environment 14 is illustrated in greater detail. The authoring environment includes a local repository 54, a repository explorer 56 which includes the static dependency checker 24, an editor 58, a content player 60, and a course viewer 62. The authoring environment 14, as explained with reference to FIG. 1, communicates with the master repository 10 to check-in and retrieve courses, and with publishing database 12 to publish courses.

The creation of the course can either be from scratch, or a template or previous course can be retrieved from the master repository to serve as a starting point. The course being developed is stored locally with the local repository 54 under the control of the repository explorer 56. The editor can view the work in progress by using the content player 60 and the view course 62 functionality. The editor 58 can save work in progress to a local repository 54 by an appropriate command to the repository explorer 56. When the author considers the course to be completed, it can be "check-in" with the master repository 10. However, prior to check-in, it is highly advisable for the author to use the static dependency checker 24 to determine whether all of the required objects have been included with the course. The author then instructs that the course be published to the publishing database 12.

In FIG. 4a, a screenshot 64 will be used to describe the operation of the repository explorer. A window 66 for the repository explorer includes a list, on the left hand side, of the various files and objects in the local work area. On the right hand side of window 66 there is a list of the files and objects in the master repository. It should be noted that while the particular example of FIG. 4a is used to illustrate the use of the repository explorer for the master repository, a very similar if not identical window is available to access the other repositories, such as local repository 54.

As noted, window 66 includes the buttons 68, 70, and 72. The button 68 is used to check-in one or more objects from the local work area to the master repository. The button 70 is used to copy one or more objects in files from the master repository to the local work area (e.g., "retrieve"). The button 72 provides for the transfer of new versions between the local work area and the master repository.

While learning solutions system 8 provides an excellent platform for the development, storage, transfer, management and use of courses and tutorials, it has been found that there are occasions when the static dependency checker alone is a less than ideal solution for insuring all of the required files are included along with the course. As mentioned previously, this can result in certain features of the course being unavailable to the learner. The resulting error messages can be a considerable source of frustration for learners.

In order to reduce the chance for a missing file or object, authors are sometimes over-inclusive in the number of objects that they provide in a course. For example, they may include objects that had been deleted from previous versions or which have been replaced by new objects or files. This presents a problem, however, in the efficient transmission and storage of courses. That is, if a great many additional objects are provided (especially if the additional objects are particularly large), the transmission time and network traffic will increase. Furthermore, if the course is stored on a fixed media, e.g., a CD-ROM or the like, the inclusion of unnecessary objects and files can create a storage capacity problem.

It is therefore desirable to provide a system and methodology to ensure that all of the required objects are provided with the course. It is also desirable not to include objects and files that are not required for the delivery or use of-the course. It is further desirable to provide a system and methodology to optimize the objects of a course for its efficient storage, delivery, and use.

DISCLOSURE OF THE INVENTION

The present invention optimizes a set of objects and files which is related by a number of dependencies. Therefore, the present invention is very useful for applications such as e-learning systems. The systems and methods for optimizing the objects and files in accordance with embodiments of the present invention can reduce the number of errors caused by the omission of a needed object, improve object size efficiency, and eliminate unneeded objects. Therefore, the system and methodologies of the present invention advantageously reduce errors and increase the efficiency of the transmission, storage, and use of the sets of objects comprising, for example, e-learning courses.

In one aspect of the present invention, a method for optimizing dependency for its sets of objects may include the operations of automatically detecting dependencies among a set of objects, adding the detected dependencies to a dependency list, and removing dependencies from the dependency list for any object that does not have at least one file dependency. Optionally, the method can further remove unused files from the set of objects. In other embodiments, a selected object can be broken into smaller objects if the selected object is greater than a maximum objects size. Alternatively, or additionally, the method can also make a selected file into a new object if the number of dependencies is greater than a maximum file dependency number.

In another other aspect of the present invention, an apparatus for optimizing dependencies for a set of objects may include means for automatically detecting dependencies among a set of objects, means for adding the detected dependencies to a dependency list, and means for a moving dependencies from the dependency list for any object that does not also have at least one file dependency. Optionally, the apparatus can also include means for removing unused files from the set of objects, means for breaking a selected object into at least two smaller objects, and means for making a selected file into a new object.

In another aspect of the present invention a method of providing a tutorial may include developing a course from an initial set of objects, each including at least one linkable file, where the initial set of objects are improved for at least one of transmission and storage purposes by the automatic detection of dependency information with regards to the initial set of objects. The improvement of the set of objects includes at least one of modifying an object, removing an object, dividing an object, and forming an object. The improved set of objects are then played for a student or learner. Optionally, a course list is prepared for a presentation to the student. The course comprising the improved set of objects and the course list may be stored in a publishing database. Multiple versions of the course can be stored in a master repository.

A computer readable media including code segments for providing a tutorial include a code segment for developing a course from an initial set of objects, each including at least one linkable file, where the initial set of objects are improved for at least one of transmission and storage by the automatic detection of dependency information. This improvement includes at least one of modifying an object, removing an object, splitting an object, and forming an object. The computer readable media further includes a code segment for playing the course for a student.

Another aspect for the present invention provides an authoring environment including a repository, a content player, and an editor. The repository is used to store a set of objects comprising a course, where each of the objects includes at least one file. The content player is coupled to the repository for receiving and playing the course. The content player includes a dependency recorder which develops a dependency list as the course is played. The editor is coupled to the content player and is capable of editing the set of objects. The editor includes a dependency analyzer which uses, as least in part, the dependency list to provide an automated dependency analysis for the course. The authoring environment can further include a dependency editor which can be used to modify, remove, split, and form objects according to the analysis of the dependency analyzer.

It will be appreciated that the present invention in its several exemplary aspects and embodiments can be used to optimize a set of objects which are related by mutual dependencies. The systems and methodology of the present invention are therefore available for a broad range of applications where it is important to include all necessary objects and files that are related by dependencies. Aspects of the present invention are also useful in optimizing sets of objects and files for efficient transmission, storage, management and use.

These and other advantages of the present invention will become apparent to those skilled in the art upon a reading of the following detailed descriptions and a study the various figures of the drawing.

MODE(S) FOR CARRYING OUT THE INVENTION

Figure 1:
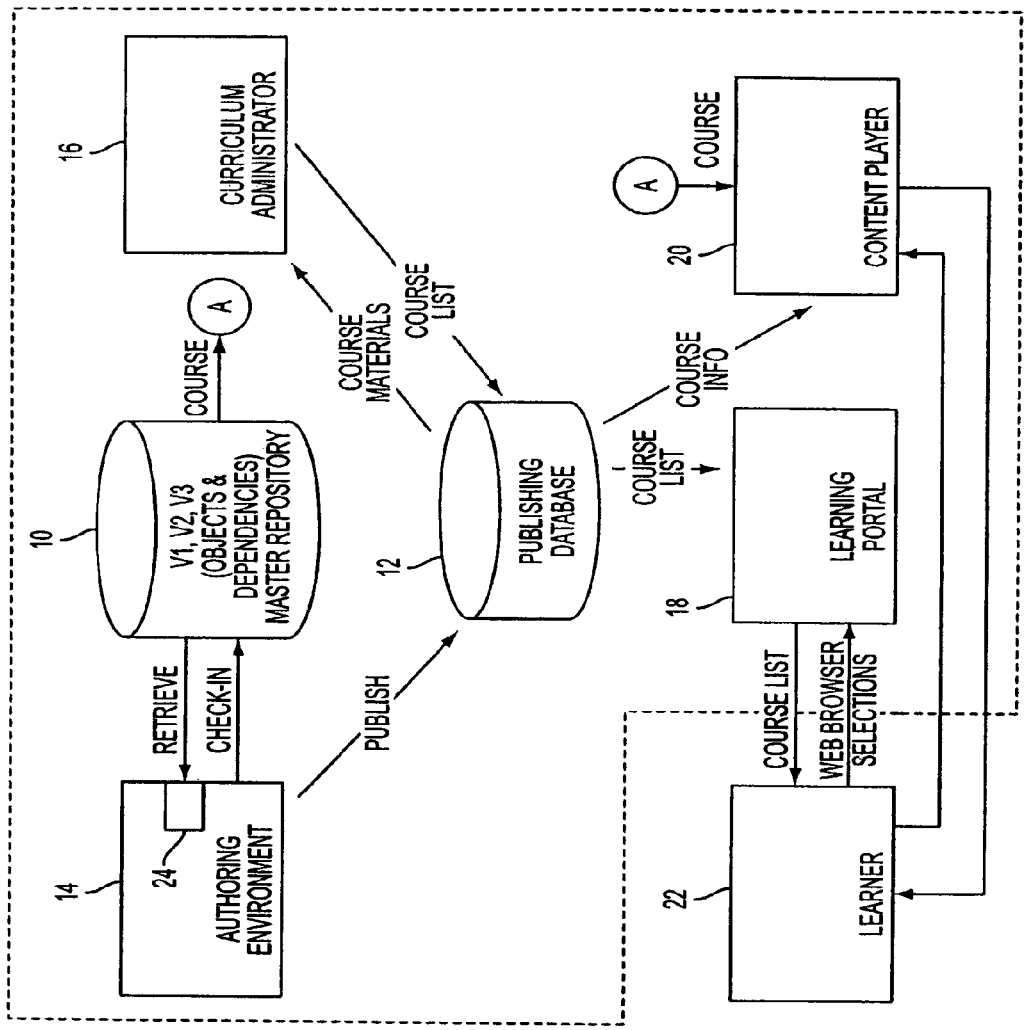
FIG. 1 is a block diagram of a learning solution system.
Figure 2:
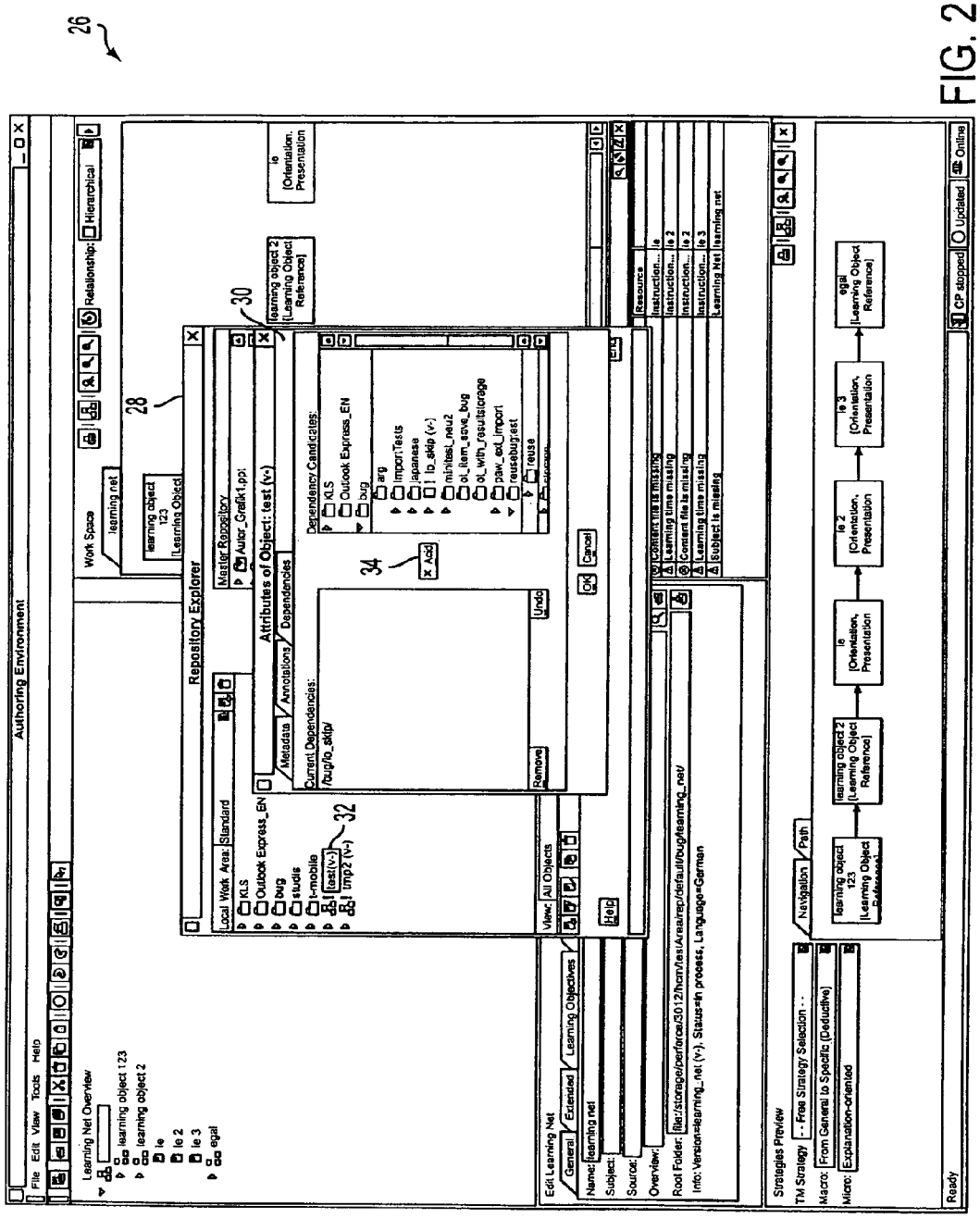
FIG. 2 is a screenshot illustrating a repository explorer window and an objects attribute window for the learning solutions system of FIG. 1.
Figure 3:
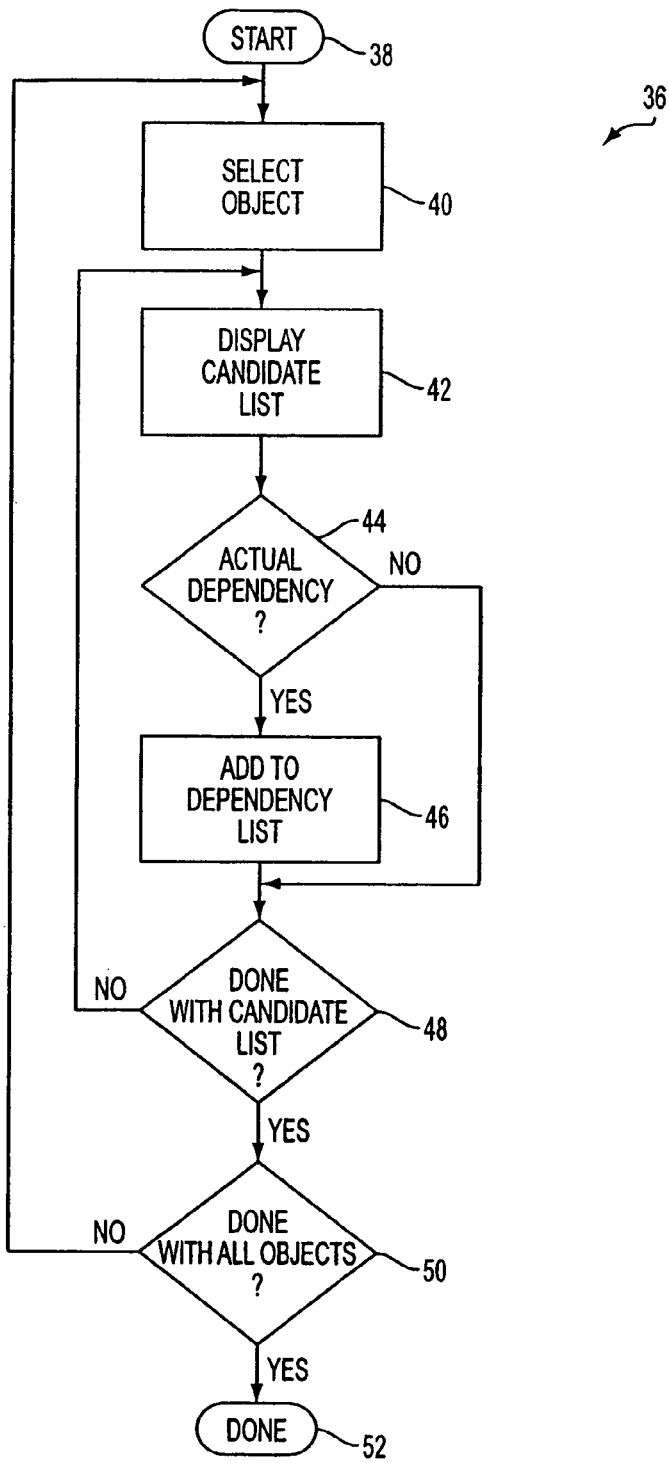
FIG. 3 is a flow diagram illustrating the operations performed by a static dependency checker of the authoring environment of FIG. 1.
Figure 4:
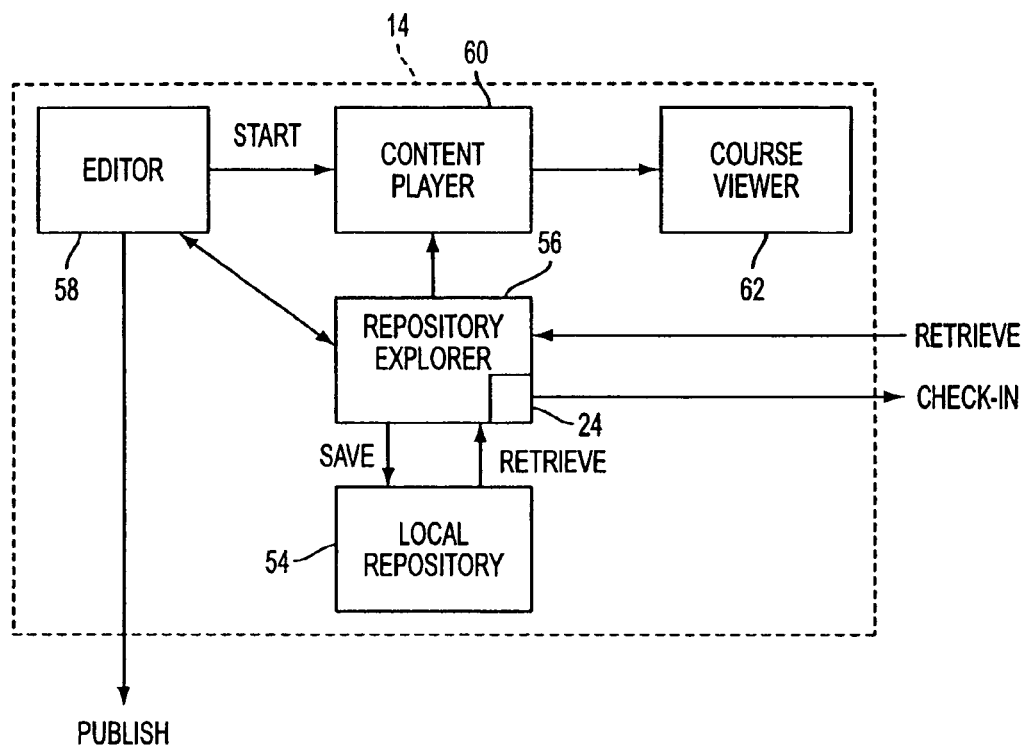
FIG. 4 is a block diagram of the authoring environment of FIG. 1.
Figure 4A:
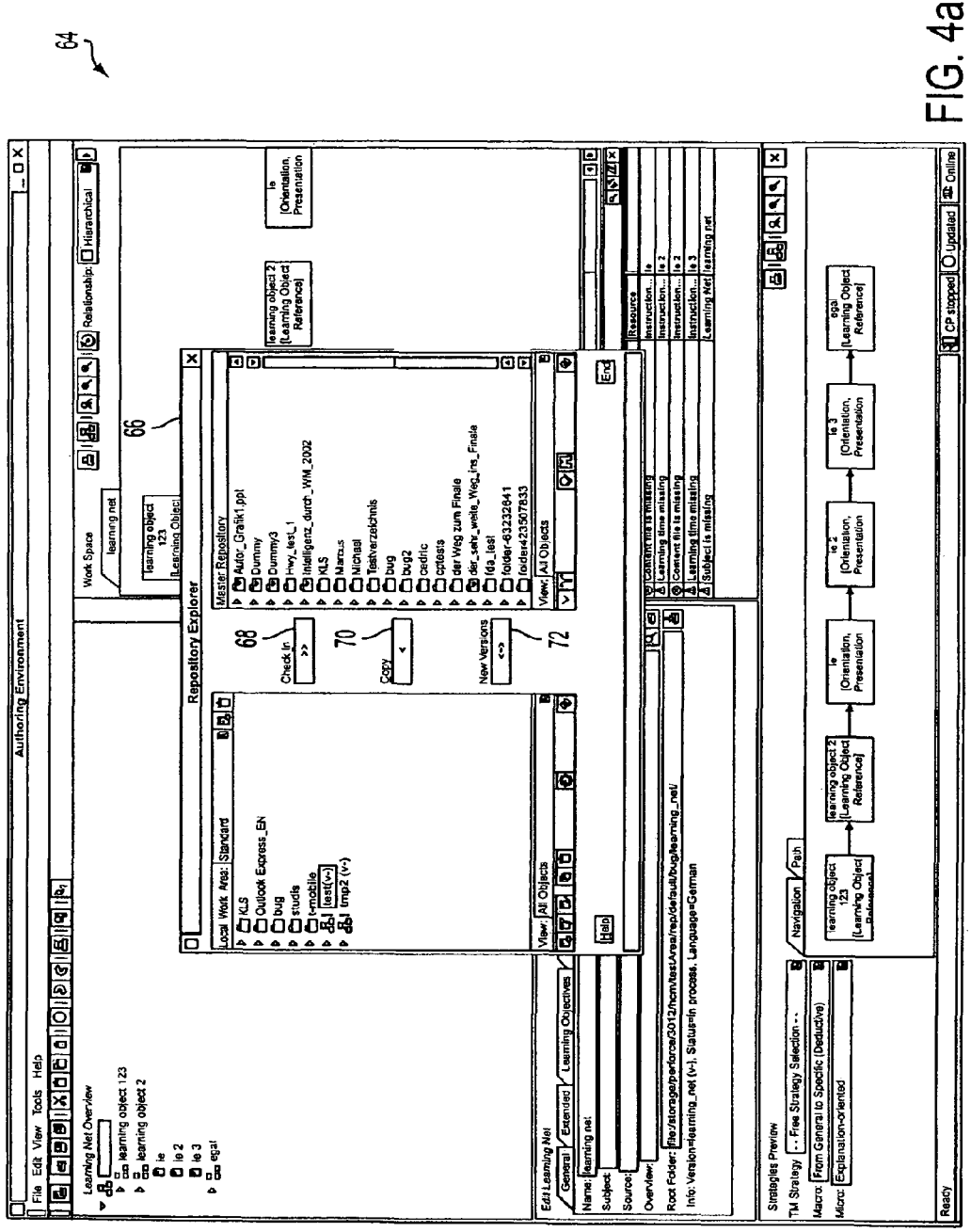
FIG. 4a is a screenshot illustrating the operation of the repository explorer of FIG. 4.
Figure 5:
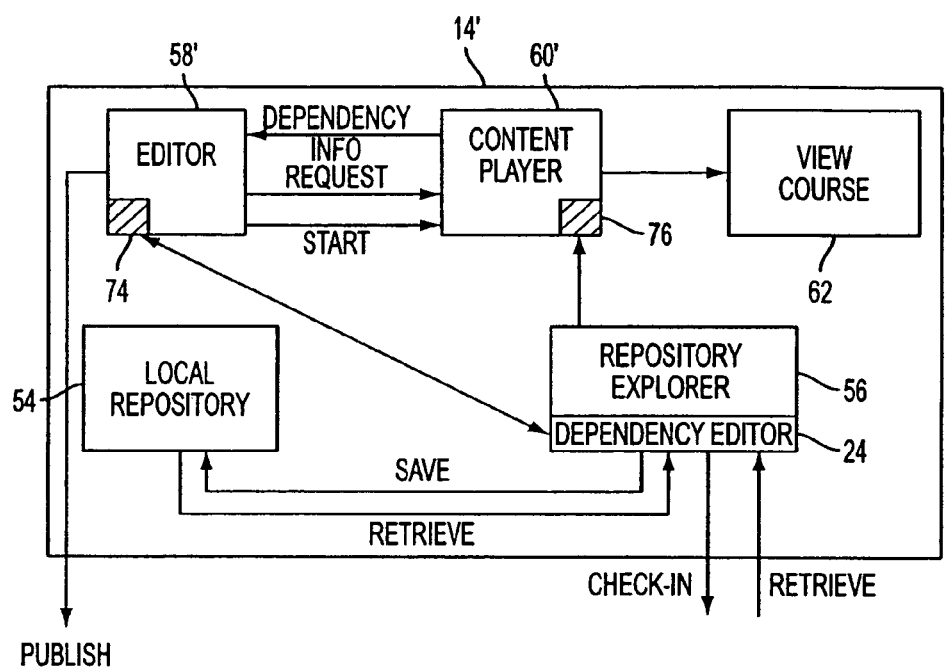
FIG. 5 is a block diagram illustrating an improved embodiment of an authoring environment in accordance with the present invention.

The background environment supporting the following descriptions was described with respect to FIGS. 1-4a. In FIG. 5, an improved authoring environment 14' will be used as an example of the systems and methodologies within the scope of the present invention.

The authoring environment 14' includes a local repository 54, a repository explorer 56, an editor 58', a content player 60', and a course viewer 62. The local repository 54, repository explorer 56, and course viewer 62 may be essentially the same as the corresponding components previously described with respect to FIG. 4. However, the authoring environment 14' has been modified with the addition of a dependency analyzer 74 to the editor 58' and a dependency recorder 76 in the content player 60'. As will be discussed in greater detail subsequently, the addition of the code segments implementing the dependency analyzer 74 and the dependency recorder 76 provides for a system and methodology for automatically optimizing a set of objects having dependencies. It should be noted that, in this example, the editor of 58' and a content player 60' have bi-directional communication. Also, it should be noted that the dependency analyzer of the editor 58' interacts with the dependency editor 24 of the repository explorer 56 in order to provide aspects of the optimization process.

Figure 6:
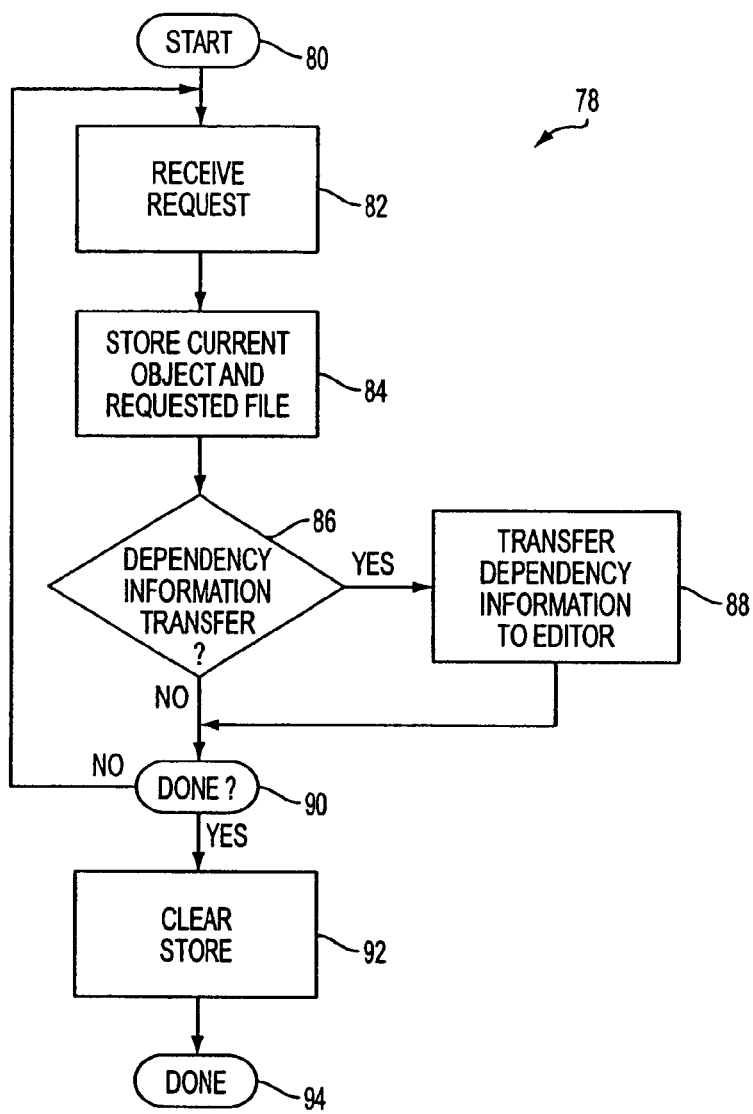
FIG. 6 is a flow diagram illustrating an exemplary process of a dependency recorder of the content player of FIG. 5.

In FIG. 6, a process 78 to implement the dependency recorder 76 of FIG. 5 is shown in the form a flow diagram. The process 78 begins at 80 and, in an operation 82, the content player receives a request for a file. In response to this request, the dependency recorder stores the identity of the current object file and the requested file in memory. The request to the content player is preferably caused by viewing an actual course using a built-in "preview" function of the authoring environment. If the complete course has been viewed, then all possible files have been requested through the content player, and all required objects will be known. In consequence, it is desirable that the entire course has been "viewed" or "traversed" so that the access lists are complete.

The process 78 then continues with a decision operation 86, wherein it is determined whether there was some dependency information that should be transferred. If there was, an operation 88 transfers the dependency information to the editor 58' to be appended to an automated dependency list. A decision operation 90 then determines whether the content is done being played and, if not, process control is returned to operation 82. If the playing of the content has been completed as determined by decision operation 90, current store is cleared and operation 92 and the process 78 is completed at 94.

Figure 7:
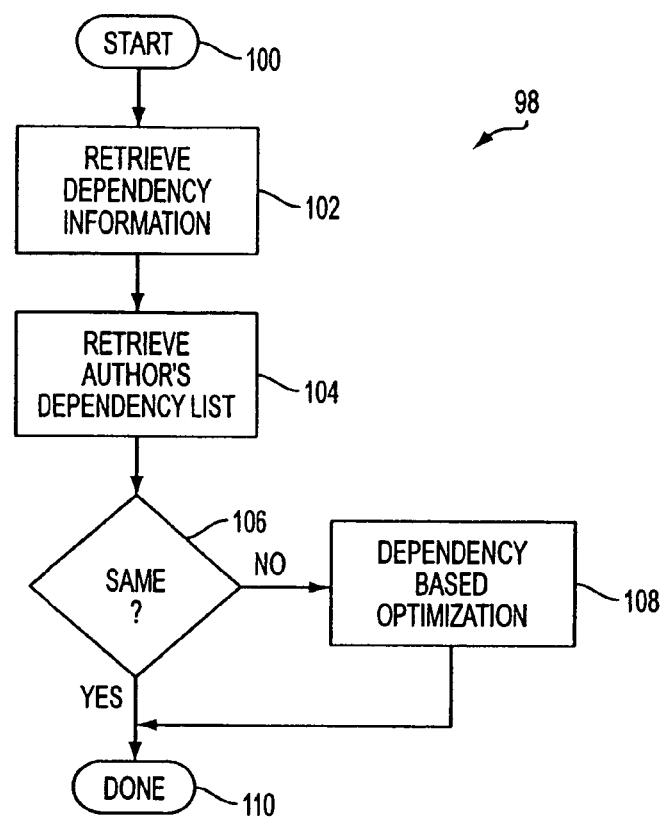
FIG. 7 is a flow diagram illustrating an exemplary process of a dependency analyzer and dependency editor of the editor and repository explorer, respectively, of FIG. 5.

FIG. 7 illustrates a process 98 which, in the present example, is implemented between the dependency analyzer 74 and the dependency editor 24 of FIG. 5. Of course, as will be appreciated by those skilled in the art, the various operations of the method 98 can be implemented in a number of places within the system or in one integrated place within the authoring system 14'. However, in the present example, the current functionality of the dependency editor 24 is leveraged such that its functionality does not have to be added into the dependency analyzer 74.

The method 98 begins at 100 and, in an operation 102, the dependency information is retrieved. Preferably this dependency information is stored as a list, although would be appreciated by those skilled in the art there are a number of ways of storing dependency information. An operation 104 retrieves the author's own dependency list and, in operation 106, it is determined whether the automatically generated dependency list derived from dependency information detected by the dependency recorder 76 is the same as the authors' own dependency list. If not, an operation 108 subjects the set of objects to a dependency based optimization process. The process 98 is then completed at 110.

Figure 8:
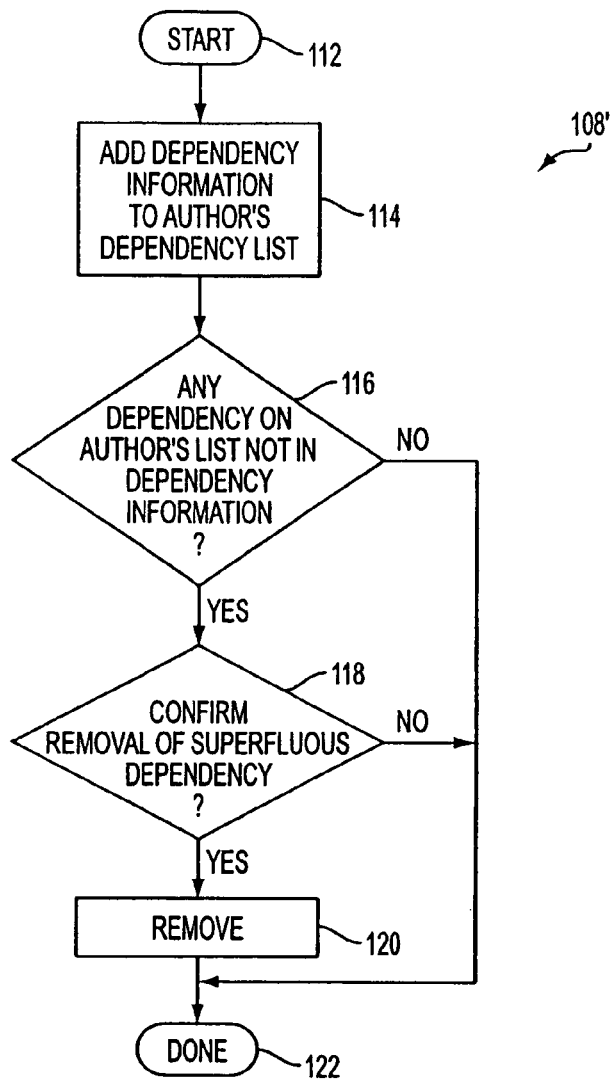
FIG. 8 is a flow diagram illustrating a first exemplary embodiment for the dependency based optimization operation of FIG. 7.

In FIG. 8, a process 108' is a first example of the dependency based optimization operation 108 of FIG. 7. The process 108' begins at 112 and, in an operation 114, dependency information that was automatically derived by the dependency recorder and stored in the automated dependency list is added to the authors' own dependency list. Then, it is determined whether there are any dependencies on the author's list that are not in the dependency list. If so, there is a suspicion that this may be superfluous dependency. Operation 118 confirms with the author whether this suspected superfluous dependency should be removed. If the author approves, the superfluous dependency is removed in operation 120 and the process is completed at 122. Should there not be any dependency on the authors' list that was not found by the dependency recorder or if the author indicates that the superfluous dependency should not be removed the operations 116 and 118, respectively, are terminated at 122.

Figure 9:
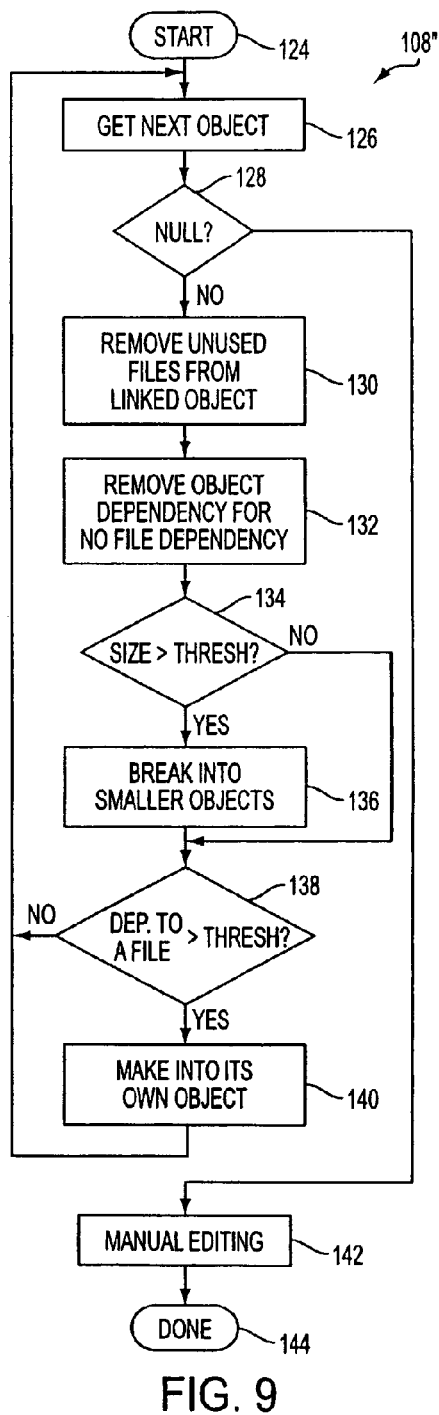
FIG. 9 is a flow diagram of a second exemplary embodiment for the dependency based optimization operation of FIG. 7.

In FIG. 9 a second example for a process 108" to implement the dependency-based optimization 108 of FIG. 7 is shown in flow diagram form. The process 108" begins at 124 and retrieves the next object for analysis in operation 126. Next, if an operation 128 determines whether an object has been retrieved (i.e., it does not have a "NULL" retrieval), an operation 130 will remove unused files from the linked object. Next, in an operation 132, object dependencies for no file dependencies are removed. A decision operation 134 then determines whether the object size is greater than a threshold. This threshold may be a predetermined threshold, or it can be a dynamic threshold based on, for example, current system capacities. If operation 134 determines that the size is greater than the threshold, then operation 136 breaks the object into smaller objects. That is, operation 134 can break a single object into two or more smaller objects. Next, in operation 138 determines whether the number of dependencies to a particular file in an object is greater than a threshold. Again, this threshold can be a predetermined threshold or a dynamic threshold. If the file is greater than the threshold, it is made into its own object, i.e., it is removed from the previous object and made into its own object. Process control then returns to operation 126 to retrieve the next object. After all of the objects had been retrieved and processed as determined by operation 128, the author is provided with the opportunity to manually edit in an operation 142. This manual editing is as described previously with respect to, for example, FIGS. 2 and 3. The process 180" is then completed at 144.

FIGS. 10A-10E will be used to describe, by way of example, the functioning of the process 180" of FIG. 9. As seen in the illustration FIG. 10A, this example, there is a set of objects consisting of objects O2, O3, O4, O5, and O7. Object O2 is shown to only file F0, object O3 is shown to have files F1, F2, and F3, object O4 is shown to have files at F6 and at F7, object O5 includes files F4 and F5, and object O7 includes files F8 and F9. File dependencies are indicated by a solid arrow where the tail of the arrow is the file that is dependent and the head of the arrow points to the object containing the file upon which the dependent file is dependent. The broken arrow indicates an object dependency without any file dependency.

Figure 10A:
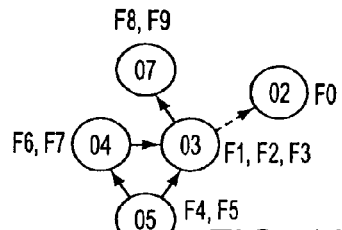
FIGS. 10A-10E illustrate a set of objects as they are optimized by the process illustrated in FIG. 9.

FIG. 10A is used, by example, to show what an exemplary set of objects with dependencies may look like prior to going through the process 180'. FIGS. 10B-10E show the set of objects as they are being optimized for storage, transmission, management, and use. It should be understood that since the optimization is on an object-by-object basis, that the illustrations of FIGS. 10A-10E are likely derived by multiple passes through the operations 126-140.

Figure 10B:
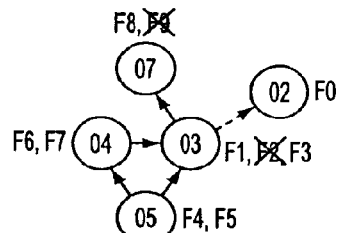

In the FIG. 10B, the operation 130 of FIG. 9 is illustrated. That is, it is determined that in object O3 that the file F2 is not used, i.e., it is not pointed to by any other file. Likewise it is determined that for object O7 that the file F9 is unused. Therefore, the operation 130 on multiple passes will remove files F2 and F9 from their respective objects O3 and O7.

Figure 10C:
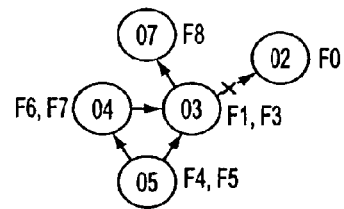

In FIG. 10C, the operation 132 of FIG. 9 removes object dependencies for which there are no file dependencies. This is illustrated as removing the broken line arrow between object O3 and O2. While object O2 includes a file F0, that file is not used by object O3. Therefore the object dependency to object O2 can be removed. Since the dependency is removed the object O2 can be removed from the set of objects comprising the course. This, of course, reduces the size of the set and, therefore, makes it more efficient to transmit, store, manage and use.

Figure 10D:
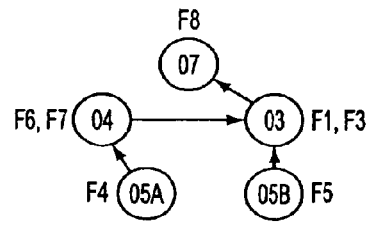

In FIG. 10D, it is determined in operation 134 that the object O5 is greater than a threshold level. Operation 136 then breaks the object O5 into smaller objects, i.e., two smaller objects in this example. In this example, the object O5 including files F4 and F5 is broken into two files O5A and O5B containing files F4 and F5 respectively. It should be noted that while object O5 had dependency to both objects O4 and O3, the new, smaller objects each only have a single object dependency. That is, object O5A has a dependency to object O4 and object O5D has a dependency to object O3.

Figure 10E:
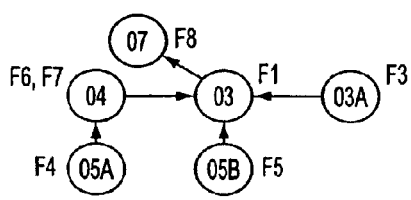

In FIG. 10E, it is determined in an operation 138 of FIG. 9 that, in this example, the file F3 of object O3 has a number of dependencies that is greater than a threshold level. In such instances, it is more efficient to make a file into its own object. Therefore, the file F3 is made into its own object O3A and is removed from the object O3. This leaves, in this example, file F1 in object O3 and file F3 in object O3A.

The set of objects of FIG. 10E has therefore been automatically optimized in multiple ways by the process 108''. However, the author may wish to manually edit this automated optimization, and can do so with the manual editing operation 142 of FIG. 9. The optimized object and file set can then be published for use by learners as described previously.

While the primary example for certain aspects of preferred embodiments of the present invention were described in terms of a set of related objects for an e-learning course, it should be noted that the present invention also has broader applicability. For example, customized software comprising a number of discrete objects coupled together by dependencies can be improved by using aspects of the present invention. For one example, a customized application program can be provided to a user including the only the functionality specified by the user in a low-error, highly efficient format. It is therefore intended that the following appended claims include all aspects, embodiments, equivalents, additions, modifications, and permutations that fall within the true spirit and scope of the present invention.

The invention claimed is:

1. A non-transitory computer-readable medium on which there are stored instructions that are executable by a processor, the instructions which, when executed by the processor, cause the processor to perform a method, the method comprising:
    obtaining from a repository a course that is at least partially composed of objects from a set of objects, each of the set of objects including at least one linkable file;
    automatically, without user interaction with the course, playing through the objects of the obtained course in a preview mode of an authoring environment that is user interactable for creating a course;
    during and based on the automatic playing of the obtained course, recording which of the linkable files is played and, for each of the recorded linkable files reached during the automatic playing by linking thereto from another of the linkable files, the respective other linkable file;
    based on the recording, developing a dependency list of dependencies, each listing of the list being of a respective dependency between a respective pair of the set of objects, the dependency being determined based on a recorded reaching, during the playing of the obtained course, of a linkable file of one of the objects of the pair by a linking thereto from a linkable file of the other object of the pair; and
    based on the dependency list, selecting a subset of objects from the set of objects to package with the course for later transmission of the course to users for playing through the objects of the course via user interaction therewith.

2. The non-transitory computer-readable medium as recited in claim 1, wherein the instructions include instructions for storing multiple versions of said course in the repository.

3. The non-transitory computer-readable medium as recited in claim 1, wherein:
    the method further includes editing one or more of said set of objects based on the dependency list;
    the editing includes at least one of modification of an object, removal of an object, splitting of an object, and forming of an object to develop an improved set of objects of the course; and
    subsequent to the editing, the course is playable for a student using the improved set of objects.

4. The non-transitory computer-readable medium as recited in claim 3, wherein the instructions include instructions for execution by the processor for handling receipt of a request for said course by said student.

5. The non-transitory computer-readable medium as recited in claim 4, wherein the handling of the receipt of the request includes, in response to the request, developing a course list for presentation to said student.

6. The non-transitory computer-readable medium as recited in claim 5, wherein the instructions include instructions, which when executed by the processor, cause the processor to store the improved set of objects as the course in the repository, and store said course list in the repository.

7. A computer system comprising:
    a repository storing a course that is at least partially composed of objects from a set of objects, each of said set of objects including at least one file; and
    at least one processor coupled to said repository and configured to:
        automatically, without user interaction with the course, play through the objects of said course in a preview mode of an authoring environment that is user interactable for creating a course;
        during and based on the automatic playing of the obtained course, record which of the files is played and, for each of the recorded files reached during the automatic playing by linking thereto from another of the files, the respective other file;
        based on the recording, develop a dependency list of dependencies, each listing of the list being of a respective dependency between a respective pair of the set of objects, the dependency being determined based on a recorded reaching, during the playing of the obtained course, of a file of one of the objects of the pair by a linking thereto from a file of the other object of the pair; and
        based on the dependency list, edit the objects included in the course for later transmission of the course to users for playing through the objects of the course via user interaction therewith.

8. The computer system as recited in claim 7, wherein the processor is configured to receive a request for said course by said student.

9. A computer system as recited in claim 8, wherein, responsive to the received request, the processor is configured to develop a course list for presentation to said student.

10. The computer system as recited in claim 9, wherein the processor is configured to store the improved set of objects as the course in the repository, and is configured to store said course list in the repository.

11. The computer system as recited in claim 7, wherein the processor is configured to store multiple versions of said course in the repository.

12. A computer system as recited in claim 7, wherein the editing of the objects includes modifying an object, removing an object, splitting an object, and forming an object to develop an improved set of objects of said course.

13. A computer system as recited in claim 7, wherein the editing includes removing from an object a file not played during the automatic playing.

14. A computer system as recited in claim 13, wherein the editing includes, subsequent to the removal of the file, removing a non-root object determined, during the automatic playing, not to include any file linked to from a file of any other of the objects of the course.

15. A computer system as recited in claim 7, wherein the editing includes removing a non-root object determined, during the automatic playing, not to include any file linked to from a file of any other of the objects of the course.

16. A computer system as recited in claim 7, wherein the processor is configured to automatically split an object of the course into a respective plurality of objects that each includes a respective one of a plurality of files of the object being split responsive to a determination that a size of the object exceeds a predetermined threshold.

17. A computer system as recited in claim 7, wherein the editing includes, responsive to determining that a file of an object of the course is linked to by more than a predetermined threshold number of other files of objects of the course, removing the respective file from the respective object of the course and storing the removed file as a new object of the course.

\* \* \* \* \*